(12) United States Patent
Nakamura et al.

(10) Patent No.: US 8,153,723 B2
(45) Date of Patent: Apr. 10, 2012

(54) PROCESS FOR PRODUCING CONJUGATED DIENE POLYMER, CONJUGATED DIENE POLYMER, AND RUBBER COMPOSITION

(75) Inventors: Takahiro Nakamura, Chuo-ku (JP); Kouichirou Tani, Chuo-ku (JP); Ryouji Tanaka, Chuo-ku (JP); Takuo Sone, Chuo-ku (JP); Toshihiro Tadaki, Chuo-ku (JP); Junko Kurazumi, Kodaira (JP); Koji Masaki, Kodaira (JP); Yoichi Ozawa, Kodaira (JP)

(73) Assignees: JSR Corporation, Tokyo (JP); Bridgestone Corporation, Tokyo (JP)

( * ) Notice: Subject to any disclaimer, the term of this patent is extended or adjusted under 35 U.S.C. 154(b) by 74 days.

(21) Appl. No.: 12/096,263

(22) PCT Filed: Dec. 5, 2006

(86) PCT No.: PCT/JP2006/324246
§ 371 (c)(1),
(2), (4) Date: Jan. 27, 2009

(87) PCT Pub. No.: WO2007/066651
PCT Pub. Date: Jun. 14, 2007

(65) Prior Publication Data
US 2009/0247695 A1 Oct. 1, 2009

(30) Foreign Application Priority Data
Dec. 5, 2005 (JP) .................................. 2005-351105

(51) Int. Cl.
*C08L 9/00* (2006.01)
*C08F 4/44* (2006.01)
(52) U.S. Cl. ........................................ 524/571; 526/191
(58) Field of Classification Search .................... 524/571
See application file for complete search history.

(56) References Cited

U.S. PATENT DOCUMENTS

| | | | | | |
|---|---|---|---|---|---|
| 3,770,840 | A | * | 11/1973 | Shepherd, Jr. ................ | 585/359 |
| 4,429,089 | A | | 1/1984 | Pedretti et al. | |
| 4,461,883 | A | * | 7/1984 | Takeuchi et al. .............. | 526/139 |
| 6,255,416 | B1 | | 7/2001 | Sone et al. | |
| 6,596,828 | B1 | | 7/2003 | Kaito et al. | |
| 7,196,031 | B2 | | 3/2007 | Kaita et al. | |
| 7,294,680 | B2 | | 11/2007 | Sone et al. | |
| 2005/0009979 | A1 | * | 1/2005 | Tanaka et al. ................. | 524/492 |
| 2007/0055029 | A1 | * | 3/2007 | Suzuki et al. ................. | 526/164 |

FOREIGN PATENT DOCUMENTS

| | | |
|---|---|---|
| EP | 0 267 675 A | 5/1988 |
| EP | 1 637 548 | 3/2006 |
| GB | 2 101 616 A | 1/1983 |
| JP | 37-8193 | 7/1962 |
| JP | 54-40890 | 3/1979 |
| JP | 58-1709 | 1/1983 |
| JP | 10-306113 | 11/1998 |
| JP | 11-35633 | 2/1999 |
| JP | 2000-34320 | 2/2000 |
| WO | WO 00/52062 | 9/2000 |
| WO | WO 2005/000921 A1 | 1/2005 |

OTHER PUBLICATIONS

S. E. Horne, Jr., et al., "Ameripol SN-A Cis-1,4-Polyisoprene", Industrial and Engineering Chemistry, vol. 48, No. 4, Apr. 1956, pp. 784-791.

* cited by examiner

*Primary Examiner* — Ling Choi
*Assistant Examiner* — Hui Chin
(74) *Attorney, Agent, or Firm* — Oblon, Spivak, McClelland, Maier & Neustadt, L.L.P.

(57) ABSTRACT

A process for simply and inexpensively producing a conjugated diene polymer with a narrow molecular weight distribution and a high cis-bond content at a low cost is provided. The process comprises a polymerization step, wherein a conjugated diene polymer having a cis-1,4-bond content of 98.5 mass % or more and a ratio (Mw/Mn) of the weight average molecular weight (Mw) to the number average molecular weight (Mn) measured by gel permeation chromatography of 2.5 or less is obtained by carrying out a polymerization reaction in conjugated diene compounds using a catalyst composition containing a rare earth element-containing compound or a reaction product of the rare earth element-containing compound with a Lewis base, an aluminoxane and/or organoaluminum compound, and an iodine-containing compound.

18 Claims, No Drawings

PROCESS FOR PRODUCING CONJUGATED DIENE POLYMER, CONJUGATED DIENE POLYMER, AND RUBBER COMPOSITION

TECHNICAL FIELD

The present invention relates to a conjugated diene polymer with a narrow molecular weight distribution and a high cis-bond content, a process for producing the same, and a rubber composition using the conjugated diene polymer.

BACKGROUND ART

A conjugated diene polymer plays a very important industrial role and is produced by polymerizing a conjugated diene compound (monomer). A number of polymerization catalysts used for the polymerization of a conjugated diene compound have been proposed. Particularly, many polymerization catalysts have been studied and developed in order to produce a conjugated diene polymer with a high cis-1,4-bond content having high performance in thermal and mechanical properties. For example, composite catalysts having, as a major component, a transition metal composition containing a transition metal such as nickel, cobalt, and titanium have been known, and some of these are widely used industrially as a polymerization catalyst for butadiene, isoprene, and the like (for example, refer to Non-patent Document 1 and Patent Document 1).

In addition, as a polymerization catalyst exhibiting high polymerization activity which is capable of producing a conjugated diene polymer with a higher cis-1,4-bond content, a composite catalyst comprising a rare earth metal-containing compound and an organometallic compound of a metal in the Group I to III has been researched and developed. For example, Patent Documents 2 to 4 disclose a method of producing a conjugated diene polymer by using a catalyst comprising a rare earth element-containing compound, methyl almoxane (MAO), an organoaluminum compound, and a halogen-containing compound. However, it has been still difficult to produce a polymer with a sufficiently narrow molecular weight distribution and a sufficiently high cis-1,4-bond content by using the catalysts disclosed in these Patent Documents. Moreover, a rubber composition produced from a conjugated diene polymer with a comparatively wide molecular weight distribution and a low cis-1,4-bond content cannot satisfy many characteristics such as mechanical properties, crack-growth resistance, and abrasion resistance, required for a rubber used for tires.

[Patent Document 1] JP-B-37-8193
[Patent Document 2] JP-A-10-306113
[Patent Document 3] JP-A-11-35633
[Patent Document 4] JP-A-2000-34320
[Non-patent Document 1] Ind. Eng. Chem., 48, 784 (1956)

DISCLOSURE OF THE INVENTION

The present invention has been completed in view of these problems in the conventional technology and has an object of providing a process for producing a conjugated diene polymer which can simply and inexpensively produce a conjugated diene polymer with a narrow molecular weight distribution and a high cis-bond content. Another object of the present invention is to provide a conjugated diene polymer with a narrow molecular weight distribution and a high cis-bond content. Still another object of the present invention is to provide a rubber composition having high tensile strength, high tensile elongation, excellent crack-growth resistance, and excellent abrasion resistance.

As a result of extensive studies in order to achieve the above objects, the inventors of the present invention have found that the above objects can be achieved by polymerizing a conjugated diene compound using a catalyst composition comprising a rare earth element-containing compound or a reaction product thereof with a Lewis base, an aluminoxane and/or an organoaluminum compound, and an iodine-containing compound. This finding has led to the completion of the present invention.

Specifically, the following process for producing a conjugated diene polymer, the conjugated diene polymer, and a rubber composition is provided according to the present invention.

[1] A process for producing a conjugated diene polymer comprising a polymerization step wherein a conjugated diene polymer having a cis-1,4-bond content of 98.5 mass% or more and a ratio (Mw/Mn) of the weight average molecular weight (Mw) to the number average molecular weight (Mn) measured by gel permeation chromatography of 2.5 or less is obtained by carrying out a polymerization reaction in conjugated diene compounds using a catalyst composition containing the following components (a) to (c):

component (a): a rare earth element-containing compound which comprises at least a rare earth element of an atomic number of 57 to 71 in the periodic table, or a reaction product of the rare earth element-containing compound with a Lewis base, component (b): an aluminoxane and/or an organoaluminum compound shown by a general formula AlR1R2 R3, wherein R1 and R2 individually represent a same or different hydrocarbon group having 1 to 10 carbon atoms, or a hydrogen atom, and R3 represents a hydrocarbon group having 1 to 10 carbon atoms which is same as or different from R1 and R2, and component (c): an iodine-containing compound which comprises at least one iodine atom in the molecular structure.

[2] The process for producing a conjugated diene polymer according to [1], wherein the 1,2-vinyl content of the obtained conjugated diene polymer is 0.3 mass % or less.

[3] The process for producing a conjugated diene polymer according to [1] or [2], wherein the polymerization reaction is carried out at a temperature of 10° C. or higher.

[4] The process for producing a conjugated diene polymer according to any one of [1] to [3], wherein the molar ratio of the iodine atom contained in the component (c) to the component (a), (iodine atom)/(component (a)), is 0.5 to 3.

[5] The process for producing a conjugated diene polymer according to any one of [1] to [4], wherein the component (c) is (c1) a metal iodide shown by a general formula $R^4{}_n XI_m$ (wherein $R^4$ is a hydrocarbon group having 1 to 20 carbon atoms or a hydrogen atom, X is a metal atom, n is an integer of 0 to 3, and m is an integer of 0 to 4), or (c2) a iodohydrocarbon compound shown by a general formula $R^5 I$ (wherein $R^5$ is a hydrocarbon group having 1 to 20 carbon atoms).

[6] A conjugated diene polymer produced by the process for producing a conjugated diene polymer according to any one of [1] to [5].

[7] A rubber composition comprising a rubber component (A) which contains the conjugated diene polymer according to [6].

[8] The rubber composition according to [7], comprising the rubber component (A) and silica and/or carbon black (B).

[9] The rubber composition according to [8], wherein the rubber component (A) contains the conjugated diene polymer in an amount of 20 mass % or more, and the rubber composition contains silica and/or carbon black (B) in an amount of 20 to 120 parts by mass per 100 parts by mass of the rubber component (A).

According to the process for producing a conjugated diene polymer of the present invention, a conjugated diene polymer with a narrow molecular weight distribution and a high cis-bond content can be produced simply and inexpensively. The conjugated diene polymer of the present invention has a narrow molecular weight distribution and a high cis-bond content.

Furthermore, the rubber composition of the present invention has high tensile strength, high tensile elongation, excellent crack-growth resistance, and excellent abrasion resistance.

BEST MODE FOR CARRYING OUT THE INVENTION

Preferred embodiments of the present invention are described below. Note that the present invention is not limited to the following embodiments. Various modifications and improvements may be made to the embodiments without departing from the scope of the present invention based on the knowledge of a person skilled in the art.

1. Process for Producing Conjugated Diene Polymer

One embodiment of the process for producing a conjugated diene polymer of the present invention comprises a polymerization step wherein a polymerization reaction is carried out in conjugated diene compounds using a catalyst composition containing predetermined components (a) to (c). Details are described below.

(Catalyst Composition)

The catalyst composition used in the process for producing a conjugated diene polymer according to the present embodiment contains the following components (a) to (c):

component (a): a rare earth element-containing compound which comprises at least a rare earth element of an atomic number of 57 to 71 in the periodic table, or a reaction product of the rare earth element-containing compound with a Lewis base, component (b): an aluminoxane and/or an organoaluminum compound shown by the general formula $AlR^1R^2R^3$, wherein $R^1$ and $R^2$ individually represent a same or different hydrocarbon group having 1 to 10 carbon atoms or a hydrogen atom, and $R^3$ represents a hydrocarbon group having 1 to 10 carbon atoms which is the same as or different from $R^1$ and $R^2$, and component (c): an iodine-containing compound which comprises at least one iodine atom in the molecular structure.

A conjugated diene polymer with a narrow molecular weight distribution and a high cis-1,4-bond content can be produced by polymerizing conjugated diene compounds (monomers) using this catalyst composition. More specifically, a conjugated diene polymer having a ratio of the weight average molecular weight (Mw) to the number average molecular weight (Mn) measured by gel permeation chromatography (GPC) (Mw/Mn) of 2.5 or less, preferably 2.2 or less, and further preferably 2.0 or less, and a cis-1,4-bond content of 98.5 mass % or more, preferably 98.7 mass % or more, and further preferably 99.0 mass % or more can be produced. Moreover, this catalyst composition is not only less expensive than the conventionally-used metallocene catalyst, but also does not require a polymerization reaction at an extremely low temperature. For this reason, the operation is simple and the catalyst composition is useful in an industrial production process. Moreover, the amount of the catalyst composition used may be smaller than the amount required when the metallocene catalyst is used. The smaller the amount of the catalyst composition, the easier the deashing operation after the polymerization reaction. Properties and characteristics of the resulting conjugated diene polymer will be described later in detail.

(Component (a))

The component (a) contained in the catalyst composition used in the process for producing a conjugated diene polymer of the present embodiment is a rare earth element-containing compound which comprises at least a rare earth element of an atomic number of 57 to 71 in the periodic table (that is, at least one lanthanoid series element), or a reaction product obtained by the reaction of the rare earth element-containing compound with a Lewis base. Neodymium, praseodymium, cerium, lanthanum, gadolinium, and the like can be given as specific examples of the rare earth element. Neodymium is preferable among these. These rare earth elements can be used individually or in combination of two or more. As specific examples of the rare earth element-containing compound, a carboxylate, an alkoxide, a β-diketone complex, a phosphate, a phosphite, and the like of the above-mentioned rare earth elements can be given. Among these, a carboxylate or a phosphate is preferable, with the carboxylate being more preferable.

As specific examples of the carboxylate of a rare earth element, a salt of carboxylic acid represented by a general formula $(R^6—CO_2)_3M$ (wherein M is a rare earth element of an atomic number from 57 to 71 of the periodic table, and $R^6$ is a hydrocarbon group having 1 to 20 carbon atoms) can be given. $R^6$ in the general formula is preferably a saturated or unsaturated alkyl group, and the alkyl group is preferably a linear, branched, or cyclic. The carboxyl group is bonded to a primary, secondary, or tertiary carbon atom. More specifically, salts of octanoic acid, 2-ethylhexanoic acid, oleic acid, stearic acid, benzoic acid, naphthenic acid, "Versatic acid" (a carboxylic acid having a carboxyl group bonded to a tertiary carbon atom, manufactured by Shell Chemical Co., Ltd.), and the like can be given. Among these, a salt of 2-ethylhexanoic acid, a salt of naphthenic acid, and a salt of Versatic acid are preferable.

As specific examples of the alkoxide of a rare earth element, a compound shown by a general formula $(R^7O)_3M$ (wherein M is a rare earth element of an atomic number from 57 to 71 of the periodic table) can be given. As specific examples of the alkoxy group represented by $R^{7O}$ in the general formula, a 2-ethylhexylalkoxy group, an oleylalkoxy group, a stearylalkoxy group, a phenoxy group, a benzylalkoxy group, and the like can be mentioned. Among these, a 2-ethylhexylalkoxy group and a benzylalkoxy group are preferable.

As specific examples of the β-diketone complex of a rare earth element, an acetylacetone complex, a benzoylacetone complex, a propionitrile acetone complex, a valeryl acetone complex, an ethyl acetylacetone complex, and the like can be mentioned. Among these, an acetylacetone complex and an ethyl acetylacetone complex are preferable.

Specific examples of the phosphate or phosphite of a rare earth element include rare earth element salts of bis(2-ethylhexyl)phosphate, bis(1-methylheptyl)phosphate, bis(p-nonylphenyl)phosphate, bis(polyethylene glycol-p-nonylphenyl)phosphate, (1-methylheptyl)(2-ethylhexyl)phosphate, (2-ethylhexyl)(p-nonylphenyl)phosphate, mono-2-ethylhexyl-2-ethylhexylphosphonate, mono-p-nonylphenyl-2-ethylhexylphosphonate, bis(2-ethylhexyl)phosphinate, bis(1-methylheptyl)phosphinate, bis(p-nonylphenyl)phosphinate, (1-methylheptyl)(2-ethylhexyl)phosphinate, and (2-ethylhexyl)(p-nonylphenyl)phosphinate. Among these, salts of bis(2-ethylhexyl)phosphate, bis(1-methylheptyl)phosphate, mono-2-ethylhexyl-2-ethylhexyl phosphonate, and bis(2-ethylhexyl) phosphinate are preferable.

Among the rare earth element-containing compounds described above, a neodymium salt of phosphoric acid or a neodymium salt of carboxylic acid are preferred, with a neodyum salt of carboxylic acid such as neodymium 2-ethylhexanoate, neodymium salt of Versatic acid being particularly preferable.

In order to solubilize the above mentioned rare earth element-containing compound in a solvent or to stably store for a long period of time, it is also preferable to use a mixture or a reaction product of the rare earth element-containing compound and a Lewis base. The amount of the Lewis base is preferably 0 to 30 mol, and more preferably 1 to 10 mol, per 1 mol of the rare earth element. As specific examples of the Lewis base, acetylacetone, tetrahydrofuran, pyridine, N,N-dimethylformamide, thiophene, diphenyl ether, triethylamine, an organic phosphorous compound, a monohydric or dihydric alcohol, and the like can be given. The component (a) mentioned above can be used individually or in combination of two or more.

(Component (b))

The component (b) contained in the catalyst composition used in the process for producing the conjugated diene polymer of the present embodiment is an aluminoxane and/or an organoaluminum compound shown by the general formula $AlR^1R^2R^3$, wherein $R^1$ and $R^2$ individually represent a same or different hydrocarbon group having 1 to 10 carbon atoms, or a hydrogen atom, and $R^3$ represents a hydrocarbon group having 1 to 10 carbon atoms which is same as or different from $R^1$ and $R^2$.

Aluminoxane (almoxane) is a compound having a structure shown by the following formula (1) or (2). The alumoxane may be an alumoxane association product disclosed in Fine Chemicals, 23 (9), 5 (1994), J. Am. Chem. Soc., 115, 4971 (1993), and J. Am. Chem. Soc., 117, 6465 (1995).

[formula 1]

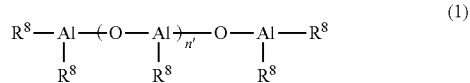

(1)

[formula 2]

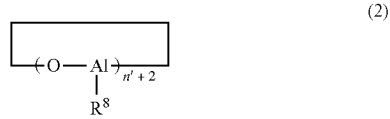

(2)

In the formulas (1) and (2), $R^8$ is a hydrocarbon group having 1 to 20 carbon atoms and n' is an integer of 2 or more. As specific examples of $R^8$ in the formulas (1) and (2), methyl, ethyl, propyl, butyl, isobutyl, t-butyl, hexyl, isohexyl, octyl, and iso-octyl groups can be given. Among these, methyl, ethyl, isobutyl, and t-butyl groups are preferable, with the methyl group being more preferable. In the formulas (1) and (2), n' is preferably an integer of 4 to 100.

As specific examples of aluminoxane, methylalmoxane (MAO), ethylalmoxane, n-propylalmoxane, n-butylalmoxane, isobutylalmoxane, t-butylalmoxane, hexylalmoxane, and iso-hexylalmoxane can be given. Aluminoxanes can be produced by a method known in the art, for example, a method of adding a trialkyl aluminum or a dialkyl aluminum monochloride to an organic solvent such as benzene, toluene, and xylene, further adding water, steam, steam-containing nitrogen gas, or a salt having crystal water such as copper sulfate pentahydrate or aluminium sulfate hexadecahydrate, and reacting the mixture. The above aluminoxanes can be used individually or in combination of two or more.

As specific examples of the organoaluminum compound, trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, and isobutylaluminum dihydride can be given. Of these, preferable organoaluminum compounds are triethylaluminum, triisobutylaluminum, hydrogenated diethylaluminum, and hydrogenated diisobutylaluminum. The organoaluminum compounds can be used individually or in combination of two or more.

(Component (C))

The component (c) contained in the catalyst composition used in the process for producing the conjugated diene polymer of the present embodiment is an iodine-containing compound which contains at least one iodine atom in its molecular structure. Any compounds containing at least one iodine atom in its molecular structure such as trimethylsilyl iodide, diethylaluminum iodide, zinc iodide, methyl iodide, butyl iodide, hexyl iodide, octyl iodide, and iodine can be used as the iodine-containing compound without specific limitations. Preferable iodine-containing compounds are (c1) a metal iodide compound shown by a general formula $R^4_nXI_m$ (wherein $R^4$ is a hydrocarbon group having 1 to 20 carbon atoms or a hydrogen atom, X is a metal atom, n is an integer of 0 to 3, and m is an integer of 0 to 4) or (c2) an iodohydrocarbon compound shown by a general formula $R^5I$ (wherein $R^5$ is a hydrocarbon group having 1 to 20 carbon atoms). As the metal atom of the metal iodide compound (c1), Si, Al, and Zn, for example, are preferable, with Si and Al being particularly preferable.

As specific examples of the metal iodide (c1), trimethylsilyl iodide, diethylaluminum iodide, zinc iodide, beryllium iodide, magnesium iodide, calcium iodide, barium iodide, cadmium iodide, mercury iodide, manganese iodide, rhenium iodide, copper iodide, silver iodide, and gold iodide can be given. Trimethylsilyl iodide and diethylaluminum iodide are preferable among these. As specific examples of the iodohydrocarbon compound (c2), methyl iodide, butyl iodide, hexyl iodide, octyl iodide, iodoform, diiodomethane, and benzylidene iodide can be given. Butyl iodide and hexyl iodide are preferable among these. These iodine-containing compounds may be used either individually or in combination of two or more.

(Catalyst Composition)

The amount of the components contained in the catalyst composition used in the process for producing the conjugated diene polymer according to the present embodiment can be appropriately determined as required. The component (a) is used in an amount preferably of 0.00001 to 1.0 mmol, and more preferably 0.0001 to 0.5 mmol per 100 g of the conjugated diene compound. If the amount is below 0.00001 mmol, the polymerization activity tends to decrease. On the other hand, the amount of beyond 1.0 mmol results in a high catalyst concentration which may require a deashing step.

When an aluminoxane is used as the component (b), the preferable amount of the aluminoxane contained in the catalyst composition can be shown by the molar ratio of the component (a) to the aluminum (Al) contained in the aluminoxane. That is, the molar ratio of the component (a) to the aluminum (Al) contained in the aluminoxane is preferably 1:1 to 1:500, more preferably 1:3 to 1:250, and particularly preferably 1:5 to 1:200. If the molar ratio is outside of the above range, the catalytic activity tends to decrease or a step of removing the catalyst residue may be necessary.

When an organoaluminum compound is used as the component (b), the preferable amount of the organoaluminum compound contained in the catalyst composition can be shown by the molar ratio of the component (a) to the organoaluminum compound. That is, the molar ratio of the component (a) to the organoaluminum compound is preferably 1:1 to 1:700, and more preferably 1:3 to 1:500. If the molar ratio is outside of the above range, the catalytic activity tends to decrease or a step of removing the catalyst residue may be necessary.

Moreover, a preferable amount of the component (c) contained in the catalyst composition can be shown by the molar ratio of the iodine atom in the component (c) to the component (a). That is, the ratio of (iodine atom)/(component (a)) (molar ratio) is preferably 0:5 to 3, more preferably 1 to 2.5, and particularly preferably 1.2 to 1.8. If the molar ratio of (iodine atom)/(component (a)) is below 0.5, the polymerization catalyst activity tends to decrease. On the other hand, if the molar ratio of (iodine atom)/(component (a)) is beyond 3, the iodine tends to act as a catalyst poison.

In addition to the components (a) to (c), the catalyst composition may optionally contain a conjugated diene compound and/or a non-conjugated diene compound in an amount of preferably not more than 1000 mol, more preferably 150 to 1000 mol, and particularly preferably 3 to 300 mol. Since the catalyst activity is further increased, the catalyst composition preferably contains the conjugated diene compound and/or the non-conjugated diene compound. Examples of the conjugated diene compound used here are same as the monomers for the polymerization such as 1,3-butadiene and isoprene which are described later. As examples of the non-conjugated diene compound, divinylbenzene, diisopropenyl benzene, triisopropenylbenzene, 1,4-vinylhexadiene, and ethylidenenorbornene can be given.

(Preparation of Catalyst Composition)

The catalyst composition used in the process for producing the conjugated diene polymer according to the present embodiment can be prepared by, for example, reacting the components (a) to (c) dissolved in a solvent with optionally-added conjugated diene compounds and/or non-conjugated diene compounds. The order of addition of each component is arbitrary, provided that it is preferable to previously mix and react the components and age the reaction product in order to increase the catalyst activity and to reduce the polymerization initiation induction period. The aging temperature is preferably 0 to 100° C., and more preferably 20 to 80° C. If the temperature is below 0° C., the aging tends to be insufficient. If the temperature is beyond 100° C., on the other hand, the catalytic activity tends to decrease and the molecular weight distribution tends to broaden. There are no particular limitations to the aging time. Before adding to a polymerization reaction vessel, the components may be caused to come in contact with each other in the lines. An aging time of 0.5 minutes or longer is sufficient. The prepared catalyst composition is stable for several days.

(Conjugated Diene Compound (Monomer))

The monomers used for polymerization in the process for producing the conjugated diene polymer of the present embodiment are conjugated diene compounds. As specific examples of this conjugated diene compound, 1,3-butadiene, 2-methyl-1,3-butadiene (isoprene), 2,3-dimethyl-1,3-butadiene, 1,3-pentadiene, 1,3-hexadiene, myrcene, and cyclo-1,3-pentadiene can be given. Among these, 1,3-butadiene, isoprene, and 1,3-pentadiene are preferable. These conjugated diene compounds may be used individually or in combination of two or more. A copolymer is obtained when two or more conjugated diene compounds are used.

(Polymerization step)

The polymerization step in the process for producing the conjugated diene polymer in the present embodiment comprises carrying out a polymerization reaction in conjugated diene compounds using a catalyst composition containing the components (a) to (c). The polymerization reaction may be carried out either in the presence or absence of a polymerization solvent. An inert organic solvent is preferably used as the polymerization solvent. As specific examples of the organic solvent suitably used, saturated aliphatic hydrocarbons having 4 to 10 carbon atoms such as butane, pentane, hexane, and heptane; saturated alicyclic hydrocarbons having 4 to 20 carbon atoms such as cyclobutane, cyclopentane, and cyclohexane; monoolefins such as 1-butene and 2-butene; aromatic hydrocarbons such as benzene, toluene, and xylene; and halogenated hydrocarbons such as methylene chloride, chloroform, carbon tetrachloride, trichloroethylene, perchloroethylene, 1,2-dichloroethane, chlorobenzene, bromobenzene, and chlorotoluene can be given. These polymerization solvents may be used either individually or in combination of two or more.

The polymerization reaction is carried out preferably at a temperature of 10° C. or more, more preferably 10 to 50° C., and particularly preferably 10 to 30° C. If the temperature is below 10° C., the catalytic activity tends to decrease and the molecular weight distribution of the resulting polymer tends to broaden. The polymerization reaction may be carried out either by a batch operation or a continuous operation. It is preferable to prevent the polymerization system from being contaminated by deactivating substances or compounds such as oxygen, water, carbon dioxide, or the like in order to prevent deactivation of the catalyst composition and the polymer. The polymerization reaction may be carried out in the presence of hydrogen gas in order to adjust the molecular weight of the resulting conjugated diene polymer.

2. Conjugated Diene Polymer

The conjugated diene polymer of the present invention is produced by the above-mentioned production process and has a cis-1,4-bond content of 98.5 mass % or more and a ratio (Mw/Mn) of the weight average molecular weight (Mw) and the number average molecular weight (Mn) measured by gel permeation chromatography (GPC) of 2.5 or less. Details are described below.

(Cis-1,4-Bond Content)

The conjugated diene polymer of the present embodiment has a cis-1,4-bond content of 98.5 mass % or more, preferably 98.7 mass % or more, and more preferably 99.0 mass % or more. If the cis-1,4-bond content is below 98.5 mass %, mechanical properties such as tensile strength and tensile elongation, crack-growth resistance, and abrasion resistance of a vulcanized rubber obtained from the conjugated diene polymer may not be sufficient. Although the upper limit of the cis-1,4-bond content is not particularly limited, such an upper limit is 99.5 mass % from the viewpoint of practical productivity. The cis-1,4-bond content of the conjugated diene polymer in the embodiment can be easily adjusted by controlling the polymerization temperature.

(Mw/Mn)

The ratio (Mw/Mn) of the weight average molecular weight (Mw) to the number average molecular weight (Mn) of the conjugated diene polymer of the present embodiment measured by GPC is 2.5 or less, preferably 2.2 or less, and more preferably 2.0 or less. If the Mw/Mn ratio is beyond 2.5, mechanical properties such as tensile strength and tensile elongation, crack-growth resistance, and abrasion resistance of a vulcanized rubber obtained from the conjugated diene polymer may not be sufficient. Although the lower limit of the Mw/Mn ratio is not particularly limited, the Mw/Mn ratio is 0.5 or more from the viewpoint of practical productivity. The Mw/Mn ratio of the conjugated diene polymer in the present embodiment can be easily adjusted by controlling the molar ratio of the components (a) to (c) contained in the catalyst composition.

The 1,2-vinyl bond content of the conjugated diene polymer of the present embodiment is preferably 0.3 mass % or less, more preferably 0.1 to 0.3 mass %, and particularly preferably 0.1 to 0.15 mass %. If the 1,2-vinyl bond content is beyond 0.3 mass %, mechanical properties such as tensile strength, tensile elongation, crack-growth resistance, and abrasion resistance of a vulcanized rubber obtained from the conjugated diene polymer may not be sufficient.

Mooney viscosity ($ML_{1+4}$ (100° C.)) of the conjugated diene polymer of the present embodiment is preferably 10 to 100, and more preferably 20 to 50. If the Mooney viscosity ($ML_{1+4}$ (100° C.)) is below 10, mechanical properties such as tensile strength, tensile elongation, crack-growth resistance, and abrasion resistance of a vulcanized rubber obtained from the conjugated diene polymer may not be sufficient. If the Mooney viscosity ($ML_{1+4}$ (100° C.)) is beyond 100, processability during a kneading operation decreases and the mechanical properties of the resulting vulcanized rubber tends to be poor.

3. Rubber Composition

One embodiment of the rubber composition of the present invention comprises the rubber component (A) which contains the above-mentioned conjugated diene polymer. Details are described below.

((A) Rubber Component)

The rubber component (A) contained in the rubber composition of the present embodiment contains the above-mentioned conjugated diene polymer. The content of the conjugated diene polymer in the rubber component (A) is preferably 20 mass % or more, more preferably 30 mass % or more, and particularly preferably 40 mass % or more. If the content of the conjugated diene polymer in the rubber component (A) is below 20 mass %, mechanical properties such as tensile strength, tensile elongation, crack-growth resistance, and abrasion resistance of a vulcanized rubber obtained from the conjugated diene polymer tend to become insufficient.

The rubber component (A) may contain only one type of the conjugated diene polymer or may contain two or more types of the conjugated diene polymer. The rubber component (A) may contain rubber components other than the conjugated diene polymer. As examples of such other rubber components, natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, and halogenated butylene rubber, and mixtures of these rubbers can be given. A part of such other rubber components may be polyfunctionalized to have, for example, a branched structure by treatment with a modifier such as tin tetrachloride or silicon tetrachloride.

((B) Silica, Carbon Black)

The rubber composition of the present embodiment preferably contains (B) silica and/or carbon black. As specific examples of silica, wet silica (hydrous silicic acid), dry silica (silicic acid anhydride), calcium silicate, and aluminum silicate can be given. Among these, wet silica is preferable due to the effect of improving fracture resistance and the most remarkable effect of maintaining both excellent wet grip characteristic and excellent low rolling resistance. These silicas may be used either individually or in combination of two or more.

SRF, GPF, FEF, HAF, ISAF, and SAF can be given as specific examples of the carbon black. Carbon black having iodine adsorption (IA) of 60 mg/g or more and dibutyl phthalate oil absorption (DBP) of 80 ml/100 g or more is preferable. The effect of improving grip performance and fracture resistance is increased by using the carbon black. HAF, ISAF, and SAF excelling in wear resistance are particularly preferred. These carbon blacks may be used either individually or in combination of two or more.

In the rubber composition of the present embodiment, silica and/or carbon black (B) are used in an amount of preferably 20 to 120 parts by mass per 100 parts by mass of the rubber component (A), and more preferably 25 to 100 parts by mass from the viewpoint of reinforcement and the improvement effect of many other properties associated with the reinforcement. If the amount of the silica and/or carbon black (B) is small, the improvement effect of fracture resistance and the like tends to be insufficient. If the amount of the silica and/or carbon black (B) is large, on the other hand, the processability of the rubber composition tends to decrease.

When silica is added to the rubber composition of the present embodiment as a filler for reinforcement, it is preferable to blend a silane coupling agent in order to further increase the reinforcing effect. As examples of the silane coupling agent, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylebenzothiazolyl tetrasulfide can be given. Among these, bis(3-triethoxysilylpropyl)polysulfide and 3-trimethoxysilylpropylbenzothiazil tetrasulfide are suitable from the viewpoint of the improvement effect of reinforcing properties and the like. These silane coupling agents can be used individually or in combination of two or more.

Although the amount of the silane coupling agent added differs according to the type of the silane coupling agent used, an amount of 1 to 20 mass % per 100 mass % of the silica is preferable, with a more preferable amount being 3 to 15 mass %. If the amount is below 1 mass %, it is sometimes difficult for the coupling agent to exhibit its effect. If the amount is beyond 20 mass %, on the other hand, the rubber component tends to become gelled.

Various chemicals, additives, and the like which are commonly used in the rubber industry can be optionally added to the rubber composition of the present embodiment to the extent that the objective of the present invention is not impaired. A vulcanizing agent, a vulcanization accelerator, process oil, an aging preventive, an antiscorching agent, zinc oxide, stearic acid, and the like can be given as chemicals, additives, and the like which can be added to the rubber composition of the present embodiment.

The rubber composition of the present invention can be produced by kneading using an open-type kneader such as a roller or a closed-type kneader such as a Banbury mixer. The rubber composition is applicable to various rubber goods by vulcanizing after molding. The rubber composition of the present embodiment is suitable for use in tire applications such as tire treads, under treads, carcasses, sidewalls, and beads, and other industrial articles such as a rubber vibration insulator, a fender material, a belt, a hose, and the like. The rubber composition of the present embodiment is particularly suitably used as a tire tread rubber.

EXAMPLES

The present invention is described below in detail by way of examples. Note that the present invention is not limited to the following examples. In the examples, "part(s)" means "part(s) by weight" and "%" means "wt %" unless otherwise indicated. The following are methods for measuring values for various properties and evaluating characteristics.

Mooney viscosity ($ML_{1+4}$, 100° C.): measured under the conditions of a preheating time of 1 minute and a measuring time of 4 minutes at a temperature of 100° C.

Molecular weight distribution (Mw/Mn): measured using a gel permeation chromatograph ("HLC-8120GPC" manufactured by Tosoh Corp.) and a differential refractometer as a detector under the following conditions.

Column: "GMHHXL" manufactured by Tosoh Corp.

Mobile phase: tetrahydrofuran

Cis-1,4 bond content (%), 1,2-vinyl bond content (%): $^1$H-NMR analysis was conducted to measure signal intensities at 5.30 to 5.50 ppm (1,4-bond) and at 4.80 to 5.01 ppm (1,2-bond). The ratio of 1,4-bond to 1,2-bond in the polymer was calculated from the results. In addition, $^{13}$C-NMR analysis was conducted to measure signal intensities at 27.5 ppm (cis-1,4-bond) and at 32.8 ppm (trans-1,4-bond). The ratio of cis-1,4-bond to trans-1,4-bond in the polymer was calculated from the results. Cis-1,4 bond content (%) and 1,2-vinyl bond content (%) were calculated from these ratios.

Tensile strength ($T_B$ (MPa)), 300% modulus ($M_{300}$ (MPa)): Tensile strength ($T_B$ (MPa)) and 300% modulus ($M_{300}$ (MPa)) were measured according to JIS K6301.

Crack-growth resistance: A 0.5 mm crack was formed at the center of a No. 3 test specimen specified in JIS K6251-1993. A 100% stress was repeatedly applied at room temperature to determine the number of times of stress application at which the test specimen was parted. The results were converted into indices taking the determined number of times obtained for the vulcanized rubber of Comparative Example 3 as 100. The larger the index, the better the crack-growth resistance.

Wear resistance: An amount of wear (g) was measured using a Lambourn-type abrader (manufactured by Shimada Giken Co., Ltd.) at a slip ratio of 60% at room temperature according to JIS K6246. The results were converted into indices taking the determined amount of wear obtained for the vulcanized rubber of Comparative Example 3 as 100. The larger the index, the better the wear resistance.

Example 1

A 5 L autoclave of which the internal atmosphere was replaced by nitrogen was charged with 2.4 kg of cyclohexane and 300 g of 1,3-butadiene. The autoclave was further charged with a catalyst composition (iodine atom/rare earth element-containing compound (molar ratio)=2.0) obtained by reacting a cyclohexane solution of neodymium versatate (Nd(ver)$_3$) (0.18 mmol), a toluene solution of methyl alumoxane (MAO) (1.8 mmol), hydrogenated diisobutylaluminum (AlBu$_2$H) (5.3 mmol), and a toluene solution of trimethylsilyl iodide (Me$_3$SiI) (0.36 mmol) with 1,3-butadiene in an amount of 5 times the mols of neodymium and aging at 50° C. for 30 minutes, to carry out a polymerization reaction 1,3-butadiene at 30° C. for 2 hours. Then, a methanol solution containing 2,4-di-tert-butyl-p-cresol (1.5 g) was added to terminate the polymerization reaction. The solvent was removed by steam stripping and the residue was dried by a roller at 110° C. to obtain 295 g of polymer. The Mooney viscosity ($ML_{1+4}$, 100° C.) of the resulting polymer was 32, the molecular weight distribution (Mw/Mn) was 1.7, the cis-1,4-bond content was 99.5 mass %, and the 1,2-vinyl bond content was 0.17 mass %.

100 parts of the obtained polymer, 50 parts of HAF carbon black, 3 parts of zinc oxide, 2 parts of stearic acid, 1 part of an aging preventive (N-isopropyl-N'-phenyl-p-phenylenediamine), 0.8 parts of vulcanization accelerator (N-cyclohexyl-2-benzothiazilsulfeneamide), and 1.5 parts of sulfur were kneaded in a plastmill. The kneaded mixture was press-vulcanized at 145° C. to obtain a vulcanized rubber. The resulting vulcanized rubber had tensile strength ($T_B$) of 21.2 MPa, 300% modulus ($M_{300}$) of 9.6 MPa, crack-growth resistance (index) of 181, and wear resistance (index) of 138.

Examples 2 to 8 and Comparative Examples 1 and 2

Polymers were obtained in the same manner as in Example 1 except for using components for the catalyst compositions and the polymerization conditions (temperature and time) shown in Table 1. Yields of the polymers obtained are shown in Table 1. Values for various properties of the obtained polymers are shown in Table 3. Vulcanized rubbers were obtained using the polymers according to the compositions shown in Table 2 by kneading and press vulcanization. Values for various properties of the vulcanized rubbers are shown in Table 3.

Comparative Example 3

Polybutadiene rubber ("BR01" manufactured by JSR Corp.) was used as a polymer of Comparative Example 3. Values for various properties of the polymer are shown in Table 3. Vulcanized rubber was obtained using the polymer according to the composition shown in Table 2 by kneading and press vulcanization. Values for various properties of the vulcanized rubbers are shown in Table 3.

TABLE 1

|  |  | Rare earth element-containing compound | | Aluminoxane | | Organoaluminum compound | | Iodine-containing compound | | Iodine atom/ rare earth element-containing compound (molar ratio) | Polymerization temperature (° C.) | Polymerization time (h) | Yield of polymer (g) |
|---|---|---|---|---|---|---|---|---|---|---|---|---|---|
|  |  | Type | Amount (mmol) | Type | Amount (mmol) | Type | Amount (mmol) | Type | Amount (mmol) | | | | |
| Example | 1 | Nd (ver)$_3$ | 0.18 | MAO | 1.8 | AlBu$_2$H | 5.3 | Me$_3$SiI | 0.36 | 2.0 | 30 | 2 | 295 |
|  | 2 | Nd (ver)$_3$ | 0.18 | MAO | 1.8 | AlBu$_2$H | 4.8 | Me$_3$SiI | 0.36 | 2.0 | 50 | 2 | 295 |
|  | 3 | Nd (ver)$_3$ | 0.18 | MAO | 1.8 | AlBu$_2$H | 7.3 | Me$_3$SiI | 0.36 | 2.0 | −10 | 2 | 50 |
|  | 4 | Nd (ver)$_3$ | 0.18 | MAO | 1.8 | AlBu$_2$H | 6.5 | Me$_3$SiI | 0.08 | 0.4 | 30 | 2 | 170 |
|  | 5 | Nd (ver)$_3$ | 0.18 | MAO | 1.8 | AlBu$_2$H | 6.5 | Me$_3$SiI | 0.6 | 3.3 | 30 | 2 | 190 |
|  | 6 | Nd (ver)$_3$ | 0.18 | MAO | 1.8 | AlBu$_2$H | 5.3 | BuI | 0.36 | 2.0 | 30 | 2 | 290 |
|  | 7 | Nd (ver)$_3$ | 0.18 | MAO | 1.8 | AlBu$_2$H | 5.3 | Et$_2$AlI | 0.36 | 2.0 | 30 | 2 | 280 |
|  | 8 | Nd (ver)$_3$ | 0.18 | MAO | 1.8 | AlBu$_2$H | 5.3 | ZnI$_2$ | 0.18 | 2.0 | 30 | 2 | 285 |
| Comparative Example | 1 | Nd (ver)$_3$ | 0.18 | MAO | 1.8 | Al(i-Bu)$_2$H | 5.3 | Me$_3$SiCl | 0.36 | — | 30 | 2 | 295 |
|  | 2 | Nd (ver)$_3$ | 0.18 | MAO | 9 | Al(i-Bu)$_2$H | 3.7 | Me$_3$SiCl | 0.36 | — | 30 | 2 | 295 |
|  | 3 | — | — | — | — | — | — | — | — | — | — | — | — |

TABLE 2

| Composition | Part |
|---|---|
| Polymer | 100 |
| HAF carbon black | 50 |
| Zinc oxide | 3 |
| Stearic acid | 2 |
| Aging preventive[*1] | 1 |
| Vulcanization accelerator[*2] | 0.8 |
| Sulfur | 1.5 |

[*1]N-isopropyl-N'-phenyl-p-phenylenediamine
[*2]N-cyclohexyl-2-benzothiazil sulfeneamide

TABLE 3

| | | Properties of polymer | | | | Properties of vulcanized rubber | | | |
|---|---|---|---|---|---|---|---|---|---|
| | | Mooney viscosity (ML$_{1+4}$(100° C.)) | Molecular weight distribution (Mw/Mn) | Cis-1,4-bond content (%) | 1,2-vinyl bond content (%) | T$_B$ (MPa) | M$_{300}$ (MPa) | Crack-growth resistance (index) | Wear resistance (index) |
| Example | 1 | 32 | 1.7 | 99.5 | 0.17 | 21.2 | 9.6 | 181 | 138 |
|  | 2 | 37 | 1.5 | 99.1 | 0.25 | 20.4 | 9.1 | 174 | 131 |
|  | 3 | 29 | 1.9 | 99.7 | 0.11 | 21.5 | 9.9 | 195 | 146 |
|  | 4 | 34 | 1.9 | 99.2 | 0.22 | 20.3 | 9.0 | 172 | 129 |
|  | 5 | 33 | 1.8 | 98.8 | 0.24 | 20.4 | 9.1 | 173 | 130 |
|  | 6 | 31 | 1.8 | 99.4 | 0.18 | 21.1 | 9.6 | 180 | 136 |
|  | 7 | 29 | 2.0 | 98.8 | 0.33 | 19.7 | 8.7 | 164 | 124 |
|  | 8 | 33 | 2.0 | 98.7 | 0.34 | 19.8 | 8.8 | 164 | 123 |
| Comparative Example | 1 | 30 | 3.7 | 98.2 | 0.35 | 19.3 | 8.3 | 153 | 109 |
|  | 2 | 36 | 2.8 | 96.8 | 0.87 | 18.9 | 8.1 | 143 | 112 |
|  | 3 | 45 | 4.8 | 94.5 | 2.52 | 16.3 | 7.5 | 100 | 100 |

As shown in Table 3, it is clear that the conjugated diene polymers of Examples 1 to 8 have a narrow molecular weight distribution, a high cis-1,4-bond content, and a low 1,2-vinyl bond content as compared with the conjugated diene copolymers of Comparative Examples 1 to 3. It is also clear that the vulcanized rubber made from the conjugated diene copolymers of Examples 1 to 8 have excellent mechanical properties such as tensile strength and modulus, crack-growth resistance, and wear resistance.

In particular, it was confirmed that due to inclusion of the metal iodide compound shown by the general formula $R^4{}_nXI_m$ (c1) or the iodohydrocarbon compound (c2) shown by the general formula $R^5I$ as the component (c), the conjugated diene copolymers of Examples 1 to 6 showed a 1,2-vinyl bond content of 0.3 mass % or less and excellent mechanical properties such as tensile strength and modulus, excellent crack-growth resistance, and excellent wear resistance.

Examples 9 to 11 and Comparative Examples 4 and 5

Vulcanized rubbers were obtained each using the polymer of Example 1, 2, or 6, or Comparative Example 1 or 3 according to the compositions shown in Table 4 by kneading and press vulcanization. Values of various properties of the vulcanized rubbers are shown in Table 5.

TABLE 4

| Composition | Part |
|---|---|
| Polymer | 40 |
| Natural rubber | 60 |
| HAF carbon black | 50 |
| Zinc oxide | 3 |
| Stearic acid | 2 |
| Aging preventive[*1] | 1 |
| Vulcanization accelerator[*2] | 0.8 |
| Sulfur | 1.5 |

[*1]N-isopropyl-N'-phenyl-p-phenylenediamine
[*2]N-cyclohexyl-2-benzothiazil sulfeneamide

TABLE 5

| | Polymer | Properties of vulcanized rubber | | | |
| | | $T_B$ (MPa) | $M_{300}$ (Mpa) | Crack-growth resistance (index) | Wear resistance (index) |
|---|---|---|---|---|---|
| Example 9 | Example 1 | 24.9 | 13.7 | 151 | 128 |
| Example 10 | Example 2 | 25.4 | 13.3 | 141 | 122 |
| Example 11 | Example 6 | 24.9 | 13.6 | 152 | 126 |
| Comparative Example 4 | Comparative Example 1 | 23.9 | 12.8 | 121 | 114 |
| Comparative Example 5 | Comparative Example 3 | 23.4 | 12.2 | 100 | 100 |

As shown in Table 5, it is clear that the vulcanized rubbers made from the compositions containing the conjugated diene copolymers of Examples 9 to 11, each blended with a natural rubber, have excellent mechanical properties such as tensile strength and modulus, crack-growth resistance, and wear resistance as compared with the vulcanized rubbers made from the compositions containing the conjugated diene copolymers of Comparative Example 4 or 5.

INDUSTRIAL APPLICABILITY

The rubber composition containing the conjugated diene polymer of the present invention can be suitably used for tire applications such as tire treads, under treads, carcasses, side walls, and beads, as well as other industrial products such as vibration-proof rubber, fender beams, belts, and hoses. The rubber composition is particularly preferable as a tire tread rubber.

The invention claimed is:

1. A process for producing a conjugated diene polymer comprising a polymerization wherein a conjugated diene polymer having a cis-1,4-bond content of 98.5 mass % or more and a ratio (Mw/Mn) of the weight average molecular weight (Mw) to the number average molecular weight (Mn) measured by gel permeation chromatography of 2.5 or less is obtained by carrying out a polymerization reaction in conjugated diene compounds using a catalyst composition comprising the following components (a) to (c):

component (a): a rare earth element comprising compound which comprises at least a rare earth element of an atomic number of 57 to 71 in the periodic table, or a reaction product of the rare earth element comprising compound with a Lewis base, component (b): an aluminoxane and organoaluminum compound shown by a general formula $AlR^1 R^2 R^3$, wherein $R^1$ and $R^2$ individually represent a same or different hydrocarbon group having 1 to 10 carbon atoms or a hydrogen atom, and $R^3$ represents a hydrocarbon group having 1 to 10 carbon atoms which is the same as or different from $R^1$ and $R^2$, and component (c): iodine.

2. The process for producing a conjugated diene polymer according to claim 1, wherein the 1,2-vinyl content of the obtained conjugated diene polymer is 0.3 mass % or less.

3. The process for producing a conjugated diene polymer according to claim 1, wherein the polymerization reaction is carried out at a temperature of 10° C. or higher.

4. The process for producing a conjugated diene polymer according to claim 1, wherein the molar ratio of the iodine atom contained in the component (c) to the component (a), (iodine atom)/(component (a)), is 0.5 to 3.

5. A conjugated diene polymer produced by the process for producing a conjugated diene polymer according to claim 1.

6. A rubber composition comprising a rubber component (A) which contains the conjugated diene polymer according to claim 5.

7. The rubber composition according to claim 6, comprising the rubber component (A) and silica and/or carbon black (B).

8. The rubber composition according to claim 7, wherein the rubber component (A) contains the conjugated diene polymer in an amount of 20 mass % or more, and the rubber composition contains silica and/or carbon black of the component (B) in an amount of 20 to 120 parts by mass per 100 parts by mass of the rubber component (A).

9. The process of claim 1, wherein in the process, the rare earth element-comprising compound comprises neodymium.

10. The process of claim 1, wherein in the process, the rare earth element-comprising compound comprises praseodymium.

11. The process of claim 1, wherein in the process, the rare earth element-comprising compound comprises cerium.

12. The process of claim 1, wherein in the process, the rare earth element-comprising compound comprises lanthanum.

13. The process of claim 1, wherein in the process, the rare earth element-comprising compound comprises gadolinium.

14. The process of claim 1, wherein in the process, the rare earth element-comprising compound is a phosphate.

15. The process of claim 1, wherein in the process, the rare earth element-comprising compound is a carboxylate.

16. The process of claim 1, wherein in the process, the component (a) comprises the product obtained by the reaction of the rare earth element-comprising compound with a Lewis base.

17. The process of claim 1, wherein in the process, in the component (b), $R^1$ is a hydrogen atom.

18. The process of claim 1, wherein in the process, in the component (b), $R^2$ is a hydrogen atom.

* * * * *